United States Patent
Toyozawa et al.

(10) Patent No.: US 7,129,939 B2
(45) Date of Patent: Oct. 31, 2006

(54) POWER SUPPLY GENERATING CIRCUIT, DISPLAY APPARATUS, AND PORTABLE TERMINAL DEVICE

(75) Inventors: Noboru Toyozawa, Kanagawa (JP); Yoshiharu Nakajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 337 days.

(21) Appl. No.: 10/467,388

(22) PCT Filed: Nov. 15, 2002

(86) PCT No.: PCT/JP02/11966

§ 371 (c)(1),
(2), (4) Date: Jul. 28, 2003

(87) PCT Pub. No.: WO03/049264

PCT Pub. Date: Jun. 12, 2003

(65) Prior Publication Data
US 2004/0055963 A1    Mar. 25, 2004

(30) Foreign Application Priority Data
Nov. 30, 2001  (JP) ............................. 2001-366340

(51) Int. Cl.
*G09G 5/00*    (2006.01)
(52) U.S. Cl. .................. 345/211; 327/536; 327/143
(58) Field of Classification Search ........... 323/266; 345/211–213; 327/536, 142–144
See application file for complete search history.

(56) References Cited

U.S. PATENT DOCUMENTS

| | | | |
|---|---|---|---|
| 5,939,866 A * | 8/1999 | Bjorkengren | 323/266 |
| 6,041,011 A | 5/2000 | Umezawa et al. | |
| 6,091,282 A * | 7/2000 | Kim | 327/536 |
| 6,476,665 B1 * | 11/2002 | Buchschacher | 327/536 |
| 6,710,773 B1 * | 3/2004 | Jenkins et al. | 345/211 |
| 6,727,681 B1 * | 4/2004 | Morita | 323/282 |
| 6,847,231 B1 * | 1/2005 | Kinugawa et al. | 326/82 |
| 2002/0036636 A1 * | 3/2002 | Yanagi et al. | 345/211 |

* cited by examiner

*Primary Examiner*—Kent Chang
(74) *Attorney, Agent, or Firm*—Robert J. Depke; Rockey, Depke, Lyons & Kitzinger LLC

(57) ABSTRACT

A power supply generating circuit, a display apparatus incorporating the same, and a portable terminal device using the display apparatus as an output display unit are provided. In a DC-DC converter having a charge pump circuit (31), a voltage dividing circuit (32), and a regulation circuit (33), p-channel MOS transistors (Qp21, Qp22, Qp31) are turned on/off based on an enable pulse enb to make the voltage dividing circuit (32) and a comparator (41) active only for a period of regulation time and inactive otherwise. This can cause a current to flow in voltage-divider resistors (R1, R2) and the comparator (41) only for a certain period of time required for the regulation operation, thus reducing the power consumption loss caused by a constant current flow in the voltage-divider resistors (R1, R2) and the comparator (41).

23 Claims, 9 Drawing Sheets

POWER SUPPLY GENERATING CIRCUIT, DISPLAY APPARATUS, AND PORTABLE TERMINAL DEVICE

This application claims priority to Japanese Patent Application Number JP2001-366340, filed Nov. 30, 2001, which is incorporated herein by reference.

TECHNICAL FIELD

The present invention relates to a power supply generating circuit, a display apparatus, and a portable terminal device. More particularly, the present invention relates to a power supply generating circuit for, based on a power supply voltage having a given voltage value, generating a power supply voltage having a different voltage value therefrom, a display apparatus incorporating the power supply generating circuit, and a portable terminal device using the display apparatus as an output display unit.

BACKGROUND ART

Recently, portable terminal devices such as cellular telephones and PDAs (Personal Digital Assistants) have become increasingly widespread. One factor that has contributed to such rapid widespread adoption of portable terminal devices is a display device incorporated therein as an output display unit or, typically, a liquid crystal display apparatus. This is because the liquid crystal display apparatus can be driven with less power in principle, and is a low power consumption display device.

In a portable terminal device, a battery of a single power supply voltage is used as a main power supply. In a liquid crystal display apparatus, on the other hand, power supply voltages having different voltage values are used depending upon a logic unit and an analog unit in a horizontal driving system for driving a pixel unit having an array of pixels, and still another power supply voltage having a greater absolute value than that of the horizontal driving system is used in a vertical driving system for selectively driving the pixels in units of rows. Therefore, a plurality of power supply voltages having different voltage values are required for driving the liquid crystal display apparatus.

A power supply generating circuit provided for each of the power supply voltages would increase the complexity of the overall structure of the liquid crystal display apparatus and the cost of the apparatus, thus making it difficult to provide a compact and low-cost portable terminal device incorporating the liquid crystal display apparatus. Accordingly, for example, a liquid crystal display apparatus incorporated in a portable terminal device includes a power supply generating circuit for, based on a power supply voltage of a battery, generating a power supply voltage having a different voltage value therefrom, called a DC-DC converter.

A variety of DC-DC converters are known in the art. One type of such DC-DC converters is a charge pump DC-DC converter. Unlike well-known DC-DC converters having an inductor, advantageously, the charge pump DC-DC converter does not require an external inductor, and contributes to the size reduction of the portable terminal device. Some charge pump DC-DC converters having a function of regulating an output potential are also known in the art.

In a liquid crystal display apparatus incorporated in a portable terminal device, the driving voltage or the driving frequency is reduced to achieve low power consumption in order to extend the life of the battery once charged. However, a liquid crystal display apparatus for this application is designed such that, typically, a DC-DC converter having the regulation ability causes a current to flow in voltage-divider resistors for use in voltage comparison at any time other than the time of voltage comparison during a regulation operation, resulting in high power-consumption loss and low efficiency. For applications to portable terminal devices such as cellular telephones and PDAs, in particular, a reduction in power consumption of the liquid crystal display apparatus itself is an important issue in order to further reduce the power consumption of the portable terminal devices.

The present invention has been made in view of the foregoing problems, and it is an object of the present invention to provide a power supply generating circuit capable of low power consumption of the overall apparatus while reducing the power consumption loss, a display apparatus incorporating the power supply generating circuit, and a portable terminal device using the display apparatus as an output display unit.

DISCLOSURE OF INVENTION

According to the present invention, at least one of a voltage dividing circuit for dividing a circuit output voltage and a comparator is active only for a certain period of time, thus reducing the power consumption loss caused by a constant current flow in voltage-divider resistors or the comparator to increase the efficiency. Therefore, the power consumption of the overall apparatus can be reduced.

BEST MODE FOR CARRYING OUT THE INVENTION

Figure 1:
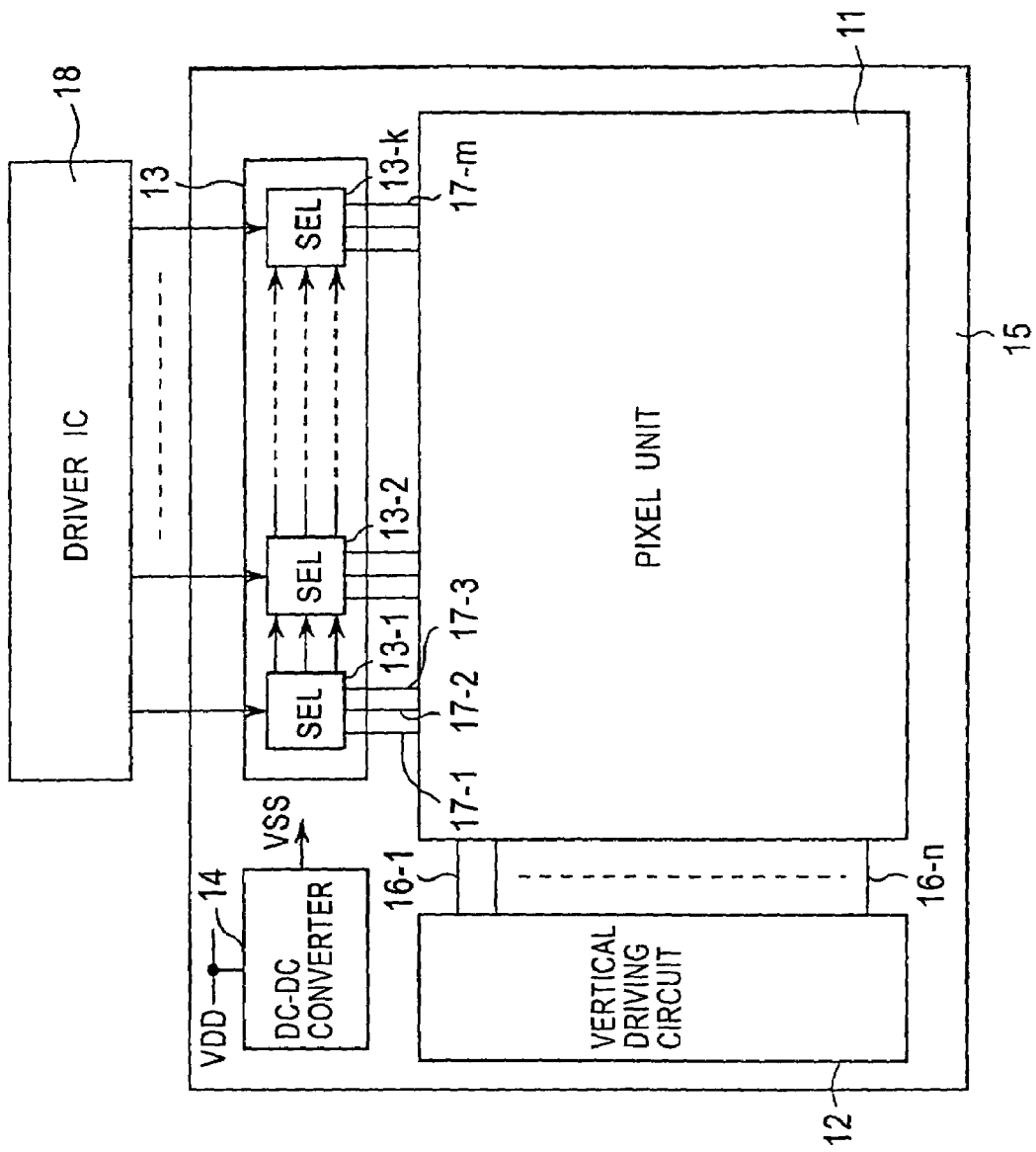
FIG. 1 is a block diagram schematically showing the overall structure of a liquid crystal display apparatus according to an embodiment of the present invention.

An embodiment of the present invention is described in detail below with reference to the drawings. FIG. 1 is a block diagram schematically showing the overall structure of a liquid crystal display apparatus according to an embodiment of the present invention.

As is apparent from FIG. 1, the liquid crystal display apparatus according to this embodiment includes a pixel unit 11 having an array of pixel circuits including liquid crystal cells, a vertical driving circuit 12 for selectively driving the pixel circuits of the pixel unit 11 in units of rows, a selector circuit 13 for selectively supplying an image signal to the pixels in the row selectively driven by the vertical driving circuit 12 under the drive control according to a selector driving method, and a DC-DC converter 14 serving as a power supply generating circuit for generating, for example, a negative power supply voltage VSS based on an internal circuit power supply voltage VDD.

The liquid crystal display apparatus according to this embodiment is of the driving circuit integration type that the vertical driving circuit 12, the selector circuit 13, and the DC-DC converter 14 are integrally formed on a substrate (hereinafter referred to as a liquid crystal display panel) 15 on which the pixel unit 11 is formed. The liquid crystal display panel 15 is configured such that switching devices of the pixel circuits, such as thin-film transistors (TFTs), are formed on a TFT substrate and a color filter, a counter electrode, and so on are formed on a counter substrate, the TFT substrate and the counter substrate being layered, with a liquid crystal material disposed between the two transparent insulating substrates (such as glass substrates).

Figure 2:
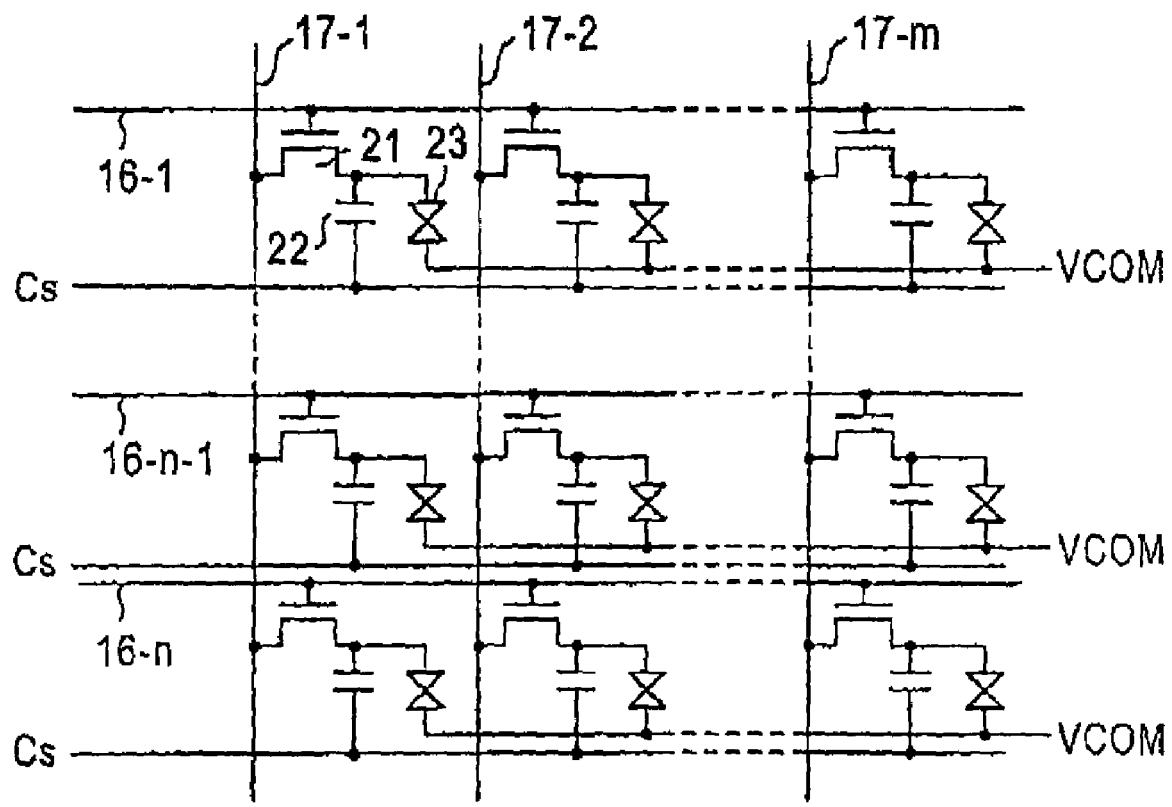
FIG. 2 is a circuit diagram showing an example of the circuit configuration of pixel circuits.

The pixel unit 11 includes a pixel array with n rows and m columns in which n scanning lines 16-1 through 16-n and m signal lines 17-1 through 17-m are arranged in a matrix, and pixel circuits are placed at intersections therebetween. As shown in FIG. 2, by way of example, each of the pixel circuits includes a switching device for selecting a pixel, such as a thin-film transistor 21, a storage capacitor 22 having an end connected with the drain of the thin-film transistor 21, and a liquid crystal capacitor (liquid crystal cell) 23 having a pixel electrode connected with the drain of the thin-film transistor 21.

The liquid crystal capacitor 23 means a capacitor between a pixel electrode formed of the thin-film transistor 21 and a counter electrode thereof. The thin-film transistor 21 has a source connected with each of the signal lines 17-1 through 17-m, and a gate connected with each of the scanning lines 16-1 through 16-n. A constant potential Cs is applied to the other end of the storage capacitor 22. A common voltage VCOM is applied to the counter electrode of the liquid crystal capacitor 23.

The pixel circuits with a basic circuit configuration have been described herein, by way of example, but are not limited thereto. For example, the pixel circuits each having a memory may support the mixture of normal display by analog image signals and still image display by digital image data stored in the memories.

The vertical driving circuit 12 is formed of, for example, a shift register or the like, and sequentially supplies a scanning pulse to the scanning lines 16-1 through 16-n of the pixel unit 11 so as to sequentially select the pixel circuits in units of rows for vertical scanning. In this example, the vertical driving circuit 12 is placed only at one side of the pixel unit 11; however, vertical driving circuits may be placed at both right and left sides of the pixel unit 11. Advantageously, the vertical driving circuits placed at both the right and left sides can prevent a delay of the scanning pulse transmitted to the pixel circuits in units of rows by the scanning lines 16-1 through 16-n.

In the liquid crystal display apparatus according to this embodiment, the signal lines 17-1 through 17-m of the liquid crystal display panel 15 are driven according to a selector driving method (time-division driving method). For this purpose, a plurality of adjacent signal lines 17-1 through 17-m are grouped in the pixel unit 11. In an example where the liquid crystal display panel 15 is color-compatible and includes, for example, B (blue), G (green), and R (red) pixel circuits repeated in the horizontal direction, every three (B, G, and R) adjacent lines are grouped in the signal lines 17-1 through 17-m. In other words, this example employs three-time-division driving method.

Color image signals corresponding to m/3 channels with respect to the m signal lines 17-1 through 17-m are supplied to the selector circuit 13 from a driver IC 18 external to the liquid crystal display panel 15. That is, the driver IC 18 outputs B, G, and R signals in a time-series manner, which are supplied on each channel to three corresponding signal lines of each group. The selector circuit 13 time-divisionally samples the time-series signals output for each channel from the driver IC 18 to sequentially supply the signals to the three signal lines of each group.

Figure 3:
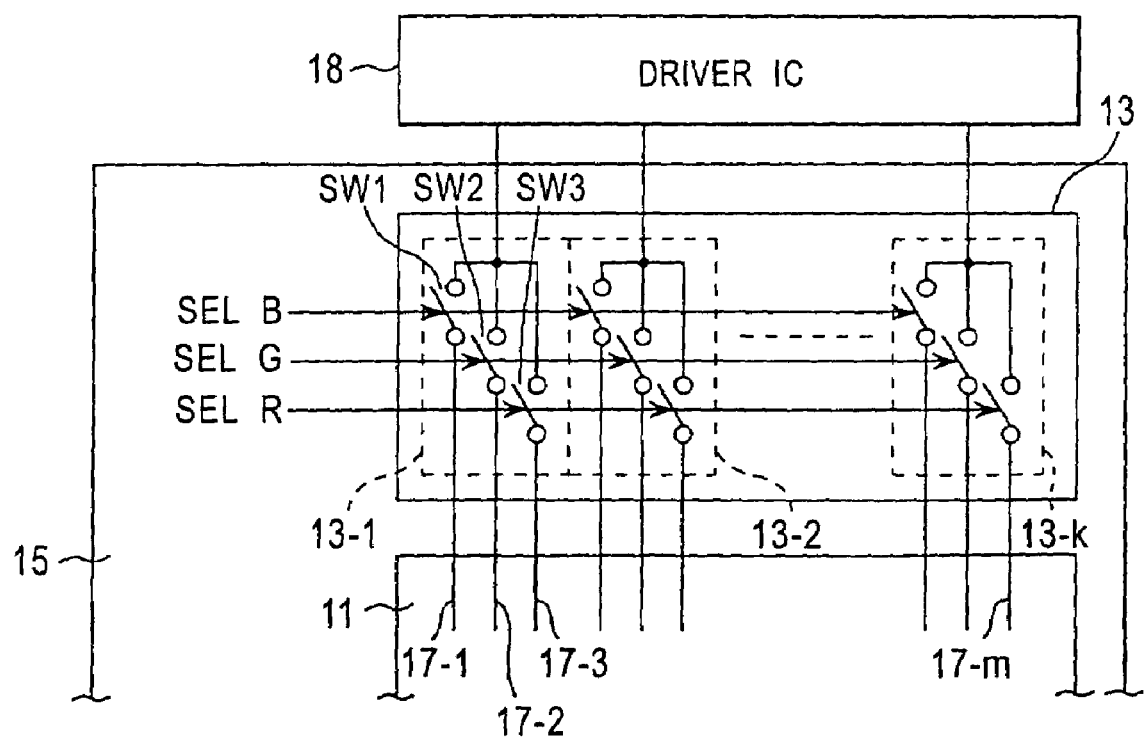
FIG. 3 is a schematic diagram of a three-time-division-driving selector circuit.

FIG. 3 is a diagram showing the concept of the three-time-division-driving selector circuit 13. As is apparent from FIG. 3, the selector circuit 13 includes selectors 13-1 through 13-k (k=m/3) corresponding to the respective output lines of the driver IC 18, and each selector is connected between one output line of the driver IC 18 and three signal lines of each group and is formed of three analog switches SW1, SW2, and SW3 for time-divisionally sampling signals supplied to the three signal lines.

When signals for three B, G, and R pixels are output in a time-series manner to one output line from the driver IC 18, the B, G, and R time-series signals are distributed and supplied in turn to the three signal lines according to the time-division driving based on the three analog switches SW1, SW2, and SW3. The three analog switches SW1, SW2, and SW3 are sequentially turned on (closed)/off (open) by selector pulses SELB, SELG, and SELR.

The feature of the present invention is a specific structure of the DC-DC converter 14. The structure and operation of the DC-DC converter 14 are described below. A power supply voltage used in a circuit incorporated in the liquid crystal display panel 15 is herein referred to as an internal circuit power supply voltage (VDD).

[First Circuit Example of the DC-DC Converter]

Figure 4:
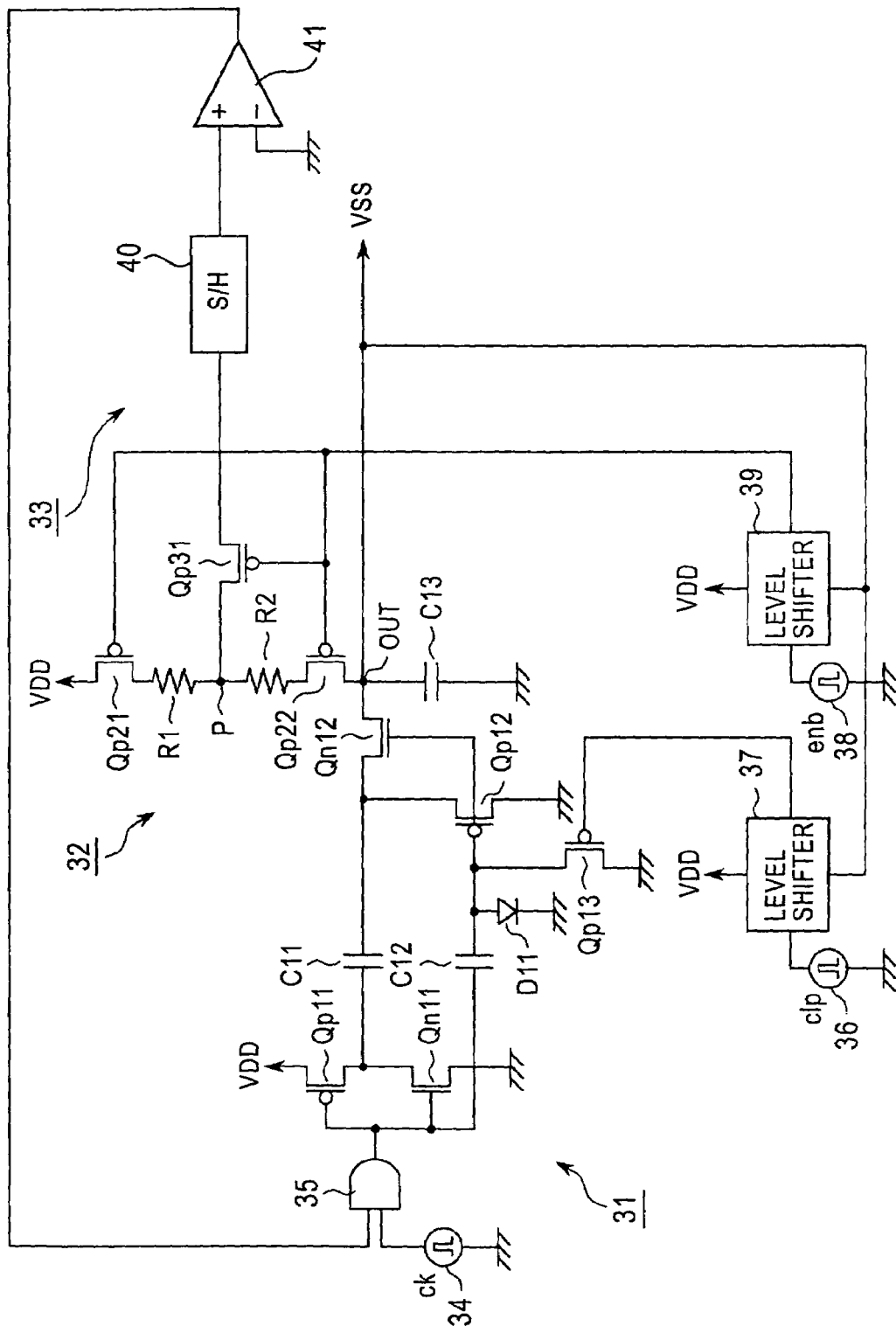
FIG. 4 is a circuit diagram of a first circuit example of the DC-DC converter.

FIG. 4 is a circuit diagram showing a specific circuit example (first circuit example) of the DC-DC converter 14. As is apparent from FIG. 4, the DC-DC converter 14 according to this circuit example includes a charge pump circuit 31, a voltage dividing circuit 32, and a regulation circuit 33. The configuration and operation of these circuit components are described in detail below.

(Charge Pump Circuit Configuration)

First, the configuration of the charge pump circuit 31 is described. The charge pump circuit 31 includes a p-channel MOS transistor Qp11, an n-channel MOS transistor Qn11, capacitors C11 and C12, a diode D11, an n-channel MOS transistor Qn12, p-channel MOS transistors Qp12 and Qp13, and a load capacitor C13, and repeats charge/discharge operations in synchronization with a clock pulse ck supplied from a clock pulse generator 34 via an AND circuit 35.

In the charge pump circuit 31, the p-channel MOS transistor Qp11 and the n-channel MOS transistor Qn11 are connected in series between an internal circuit power supply VDD and a ground (GND), and the gates of these transistors are commonly connected, thereby forming a CMOS inverter. A first end of the capacitor C11 is connected with a common drain node of the MOS transistors Qn11 and Qp11.

The n-channel MOS transistor Qn12 has a drain connected to a second end of the capacitor C11, and a source connected to a circuit output terminal OUT. The load capacitor C13 is connected between the circuit output terminal OUT and the ground. The p-channel MOS transistor Qp12 has a source connected to the second end of the capacitor C11, and a drain connected to the ground. The MOS transistors Qn12 and Qp12 serve as switching devices which are turned on (conduct) when a switching pulse described below is applied to the gates.

A first end of the capacitor C12 is connected to the common gate node of the MOS transistors Qn11 and Qp11. The diode D11 has an anode connected to a second end of the capacitor C12, and a cathode connected to the ground. The diode D11 functions to diode-clamp a switching pulse voltage applied to the gates of the MOS transistors Qn12 and Qp12 when the circuit is initiated. The MOS transistor Qp13 has a source connected to the second end of the capacitor C12, and a drain connected to the ground.

A clamp pulse clp generated by a clamp pulse generator 36 is supplied to the gate of the MOS transistor Qp13 via a level shifter 37. When the clamp pulse clp is applied to the gate of the MOS transistor Qp13, the MOS transistor Qp13 functions to clamp the switching pulse voltage applied to the gates of the MOS transistors Qn12 and Qp12 to a ground voltage GND.

Given that an internal circuit power supply voltage VDD indicates the positive power supply voltage and a circuit output voltage VSS led to the circuit output terminal OUT indicates the negative power supply voltage, the level shifter 37 level-shifts the clamp pulse of a first amplitude voltage (VDD-0V) generated by the clamp pulse generator 36 to the clamp pulse of a second amplitude voltage (VDD-VSS), and supplies the resulting pulse to the gate of the p-channel MOS transistor Qp13. This ensures the switching operation of the p-channel MOS transistor Qp13.

(Charge Pump Circuit Operation)

The operation of the charge pump circuit 31 of the above-described structure is described below. When the power supply is turned on (when the circuit is initiated), the clock pulse generated by the clock pulse generator 34 is supplied as a switching pulse via the AND circuit 35, and the output potential of the capacitor C12 based on the switching pulse is first clamped to a potential whose level is shifted by the diode D11 by a threshold voltage Vth of the diode D11 from the ground level. When the switching pulse is in a low level (0 V), the p-channel transistors Qp11 and Qp12 conduct, thus causing the capacitor C11 to be charged. The n-channel MOS transistor Qn11 does not conduct at this time, and the potential at the common drain node of the MOS transistors Qp11 and Qn11 becomes the VDD level.

Then, when the switching pulse goes to the high level (VDD level), the n-channel MOS transistors Qn11 and Qn12 conduct, and the potential at the common drain node of the MOS transistors Qp11 and Qn11 becomes the ground level (0 V), so that the potential at the output end of the capacitor C11 becomes the −VDD level. This potential (−VDD) is led as the circuit output voltage VSS from the circuit output terminal OUT via the n-channel MOS transistor Qn12.

Then, when the circuit output voltage VSS rises to some extent (when the initiation process ends), the level shifter 37 starts operating to level-shift the clamp pulse clp. When the level shifter 37 starts operating, the clamp pulse clp of the amplitude voltage VDD-0V generated by the clamp pulse generator 36 is level-shifted by the level shifter 37 to the clamp pulse of the amplitude voltage VDD-VSS, and is then applied to the gate of the p-channel MOS transistor Qp13 when appropriate.

The low level of the clamp pulse corresponds to the circuit output voltage VSS, that is, the −VDD level, which ensures that the p-channel MOS transistor Qp13 conducts.

This causes the potential of the anode of the diode D11 to be clamped to the ground level rather than the potential shifted by the threshold voltage Vth of the diode D11 from the ground level. Thus, during the later pumping operation, a sufficient driving voltage can be supplied to, in particular, the p-channel MOS transistor Qp12.

Therefore, a sufficient switching current can flow in the p-channel MOS transistor Qp12, thus ensuring stable DC-DC conversion with high conversion efficiency. Since a sufficient switching current can be obtained without increasing the size of the p-channel MOS transistor Qp12, a large current capacity DC-DC converter can be achieved with a small circuit. This effect is remarkable particularly when transistors having a large threshold voltage Vth, such as TFTs (thin-film transistors), are used.

(Voltage Dividing Circuit Configuration)

Next, the configuration of the voltage dividing circuit 32 is described. As is apparent from FIG. 4, the voltage dividing circuit 32 includes voltage-divider resistors R1 and R2 connected in series with each other, and switching devices connected in series with the resistors R1 and R2, such as p-channel MOS transistors Qp21 and Qp22. The p-channel MOS transistor Qp21 is connected between a reference potential point (in this example, the internal circuit power supply VDD) and one end of the resistor R1. The p-channel MOS transistor Qp22 is connected between one end of the resistor R2 and the circuit output terminal OUT.

In this example, in the voltage dividing circuit 32, the voltage-divider resistors R1 and R2 are designed so as to have an equal resistance. When the negative power supply voltage VSS led to the circuit output terminal OUT becomes the −VDD level, the voltage-divider point P between the voltage-divider resistors R1 and R2 has a potential of 0 V (ground level). It is to be noted that the resistances of the voltage-divider resistors R1 and R2 are not necessarily equal, and may be set as required.

The voltage dividing circuit 32 is active to perform voltage division only for a certain period of time during which the p-channel MOS transistors Qp21 and Qp22 are conducting. The p-channel MOS transistors Qp21 and Qp22 receive via the gates an enable pulse enb generated by an enable pulse generator 38 and supplied via a level shifter 39. When the enable pulse enb is applied to the gates, the p-channel MOS transistors Qp21 and Qp22 conduct so that the voltage dividing circuit 32 becomes active.

Figure 5:
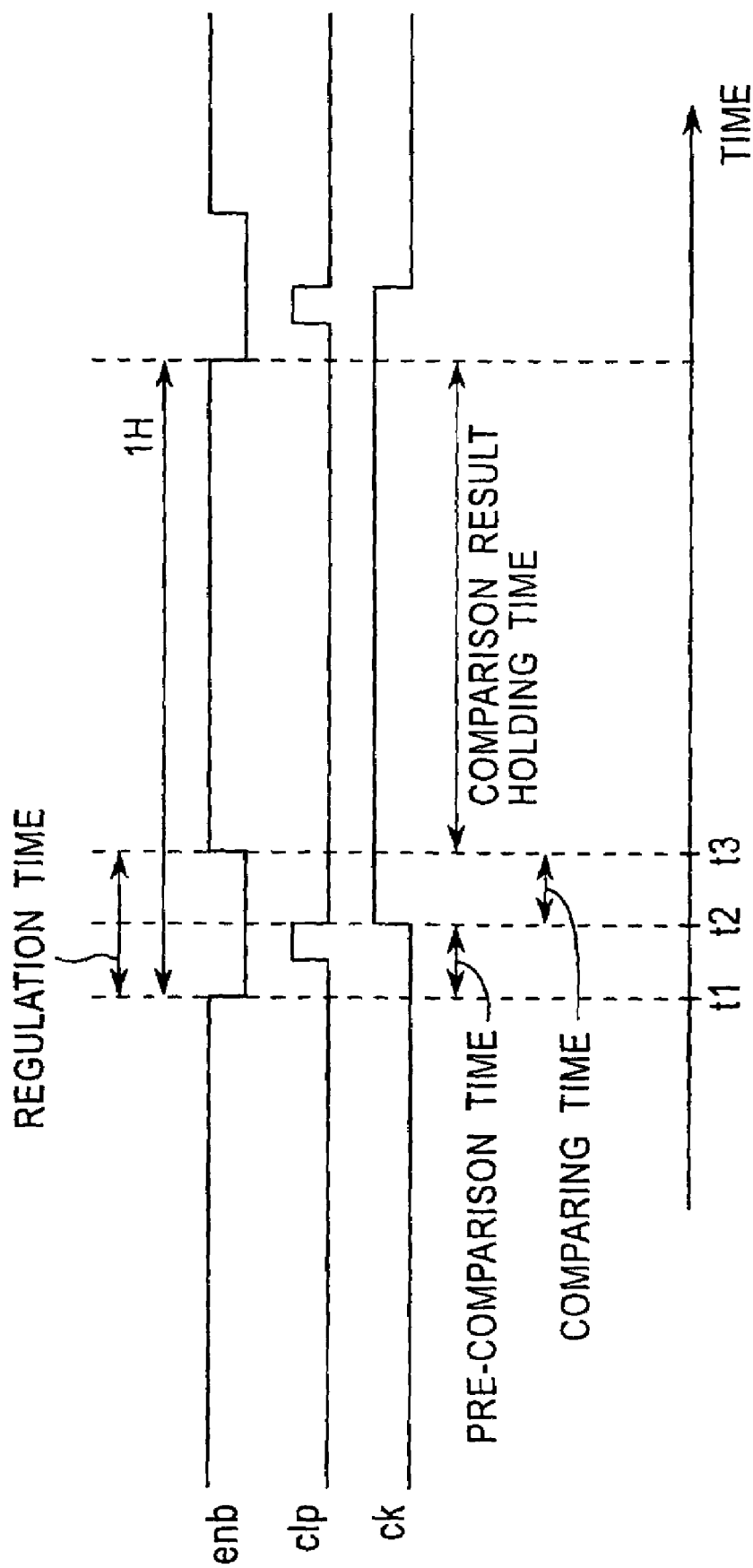
FIG. 5 is a timing chart for illustrating the operation of the DC-DC converter according to the first circuit example.

Assuming that the clock pulse ck generated by the clock pulse generator 34 has a period of 2H (H denotes the horizontal scanning period), as depicted in the timing chart of FIG. 5, the enable pulse enb is generated from the enable pulse generator 38 at intervals of 1H. The enable pulse enb is in the low level only for a certain period of time during the 1H period. The enable pulse enb causes the MOS transistors Qp21 and Qp22 to conduct in this low-level period, thereby making the voltage dividing circuit 32 active.

Given that the internal circuit power supply voltage VDD represents the positive power supply voltage and the circuit output voltage VSS led to the circuit output terminal OUT represents the negative power supply voltage, the level shifter 39 level-shifts an enable pulse of a first amplitude voltage (VDD-0V) generated by the enable pulse generator 38 to an enable pulse of a second amplitude voltage (VDD-VSS), and supplies the resulting pulse to the gates of the p-channel MOS transistors Qp21 and Qp22. This results in a sufficient driving voltage to the p-channel MOS transistors Qp21 and Qp22, thus ensuring the switching operation thereof.

(Regulation Circuit Configuration)

Finally, the configuration of the regulation circuit 33 is described. As is apparent from FIG. 4, the regulation circuit 33 includes a switching device such as a p-channel MOS transistor Qp31, a sample-and-hold (S/H) circuit 40, a comparator 41, and the above-described AND circuit 35.

In the regulation circuit 33, the p-channel MOS transistor Qp31 is connected between the voltage-divider point P of the voltage dividing circuit 32 and a non-inverting (+) input terminal of the comparator 41, and receives the above-noted enable pulse enb via the gate. The MOS transistor Qp31 conducts for a period when the voltage dividing circuit 32 is active to transmit the divided voltage obtained at the voltage-divider point P to the sample-and-hold circuit 40 and the comparator 41.

The sample-and-hold circuit 40 holds the divided voltage transmitted via the MOS transistor Qp31 until the next time the MOS transistor Qp31 conducts, and continuously supplies it to the non-inverting input terminal of the comparator 41. The comparator 41 has an inverting (−) input terminal to which a reference voltage (in this example, the ground level) is applied, and is active when the MOS transistor Qp31 conducts and the divided voltage obtained at the voltage-divider point P of the voltage dividing circuit 32 is supplied to the comparator 41 via the MOS transistor Qp31, so that the divided voltage is compared with the reference voltage. When the divided voltage exceeds the reference voltage, the high-level comparison result is supplied to the AND circuit 35 as a gate control signal thereof.

(Regulation Circuit Operation)

The regulation operation of the regulation circuit 33 of the above configuration is described below.

As depicted in the timing chart of FIG. 5, the low-level time (t1 through t3) of the enable pulse enb during a period of 1H is called the regulation time. Furthermore, the time from a fall time t1 of the enable pulse enb to a transition time t2 of the clock pulse ck is called the pre-comparison time in the comparator 41, and the time from the transition time t2 of the clock pulse ck to a rise time t3 of the enable pulse enb is called the comparing time of the comparator 41. It is assumed that the clamp pulse clp is generated during the low-level time (t1 through t3) of the enable pulse enb.

First, the voltage dividing circuit 32 is active for the regulation time when the enable pulse enb is low, and a divided voltage corresponding to the potential of the circuit output terminal OUT is obtained at the voltage-divider point P of the voltage dividing circuit 32. When the negative output voltage VSS obtained at the circuit output terminal OUT does not reach the −VDD level that is the target voltage, the voltage-divider point P has a potential higher than the 0 V (ground level).

At this time, the non-inverting input voltage (the voltage of the voltage-divider point P) is over the inverting input voltage (ground level), and the comparator 41 supplies the high-level comparison result to the AND circuit 35. Then, the AND circuit 35 supplies the clock pulse ck to the charge pump circuit 31. In synchronization with the clock pulse ck, a pumping operation is performed in the charge pump circuit 31. The sequence of operations is repeatedly performed every 1H period. Finally, the negative output voltage VSS reaches the target −VDD level voltage.

When the negative output voltage VSS reaches the target −VDD level voltage, the potential of the voltage-divider point P becomes 0 V (ground level). At this time, the non-inverting input voltage (the voltage of the voltage-divider point P) is equal to the inverting input voltage (ground level), and the comparator 41 supplies the low-level comparison result to the AND circuit 35. Then, the AND circuit 35 stops supplying the clock pulse ck to the charge pump circuit 31.

In this way, the voltage dividing circuit 32 divides the difference between the circuit output voltage VSS obtained at the circuit output terminal OUT and the internal circuit power supply voltage VDD, the comparator 41 compares the divided voltage obtained at the voltage-divider point P of the voltage dividing circuit 32 with the reference voltage (in this example, the ground level), and, based on the comparison result, the AND circuit 35 controls the supply of the clock pulse ck (switching pulse) to the charge pump circuit 31, thereby operating the regulation circuit so that the circuit output voltage VSS becomes the target −VDD level voltage.

In the DC-DC converter 14 of the above configuration according to the present embodiment, the p-channel MOS transistors Qp21, Qp22, and Qp31 are turned on/off based on the enable pulse enb to make the voltage dividing circuit 32 and the comparator 41 active only for the regulation time and inactive otherwise. This causes a current to flow in the voltage-divider resistors R1 and R2 and the comparator 41 only for a certain period of time required for the regulation operation, thus reducing the power consumption loss caused by a constant current flow in the voltage-divider resistors R1 and R2 and the comparator 41.

[Second Circuit Example of the DC-DC Converter]

Figure 6:
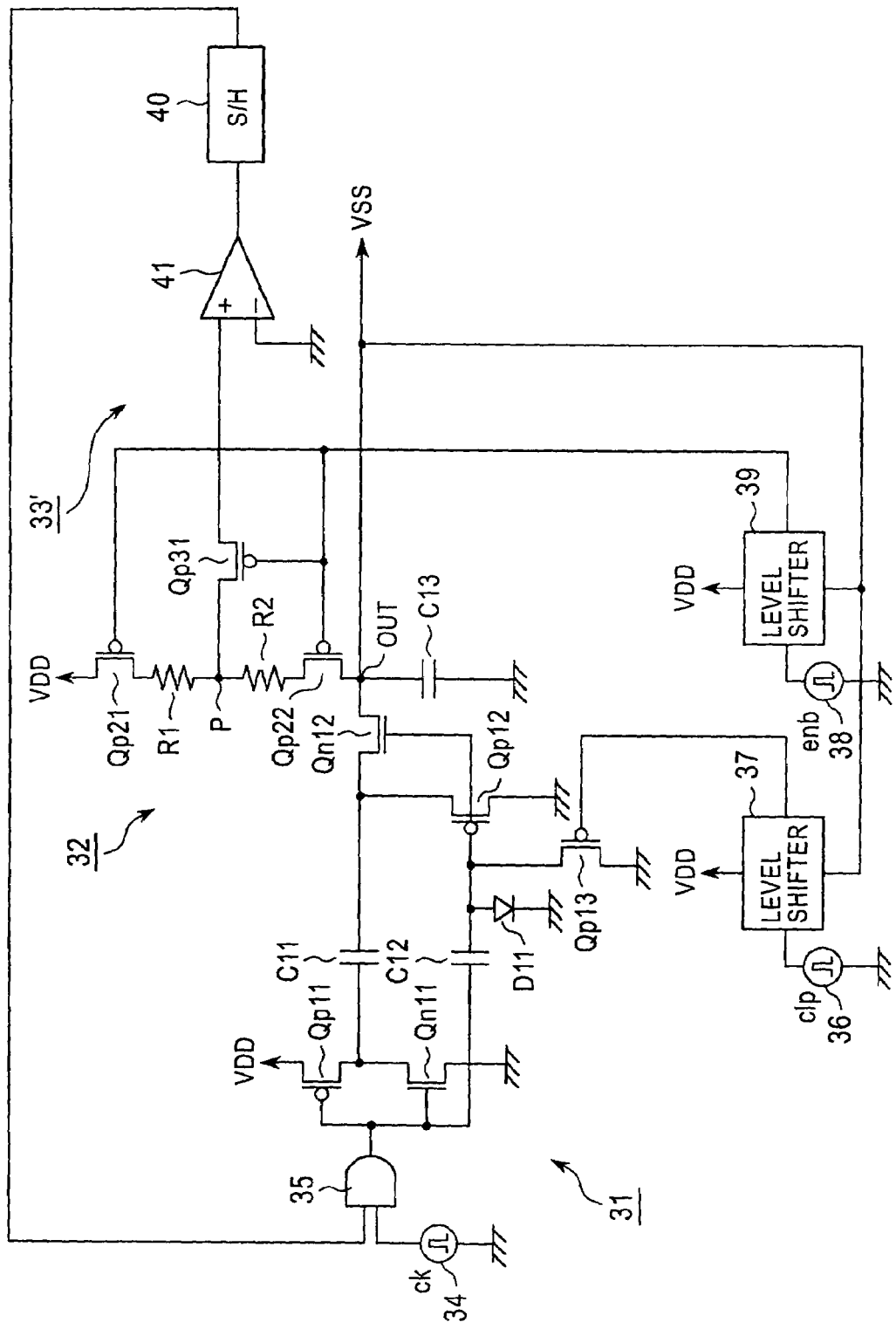
FIG. 6 is a circuit diagram of a second circuit example of the DC-DC converter.

FIG. 6 is a block diagram showing another circuit example (second circuit example) of the DC-DC converter 14. In FIG. 6, equivalent portions to those shown in FIG. 4 are designated by the same reference numerals.

The DC-DC converter 14 according to the second circuit example includes a regulation circuit 33' having a different configuration from that of the regulation circuit 33 in the first circuit example, and other configuration of the DC-DC converter 14 is the same. In the regulation circuit 33' in this circuit example, the sample-and-hold circuit 40 is located after the comparator 41, which is different from the first circuit example in which the sample-and-hold circuit 40 is located before the comparator 41.

Specifically, in the regulation circuit 33 in the first circuit example, the divided voltage obtained from the voltage dividing circuit 32 is held by the sample-and-hold circuit 40; whereas, in the regulation circuit 33' in the second circuit example, the comparison result of the comparator 41 is held by the sample-and-hold circuit 40. The only difference is this point, and there is no difference in circuit operation of regulation in the regulation circuit 33'.

[Third Circuit Example of the DC-DC Converter]

Figure 7:
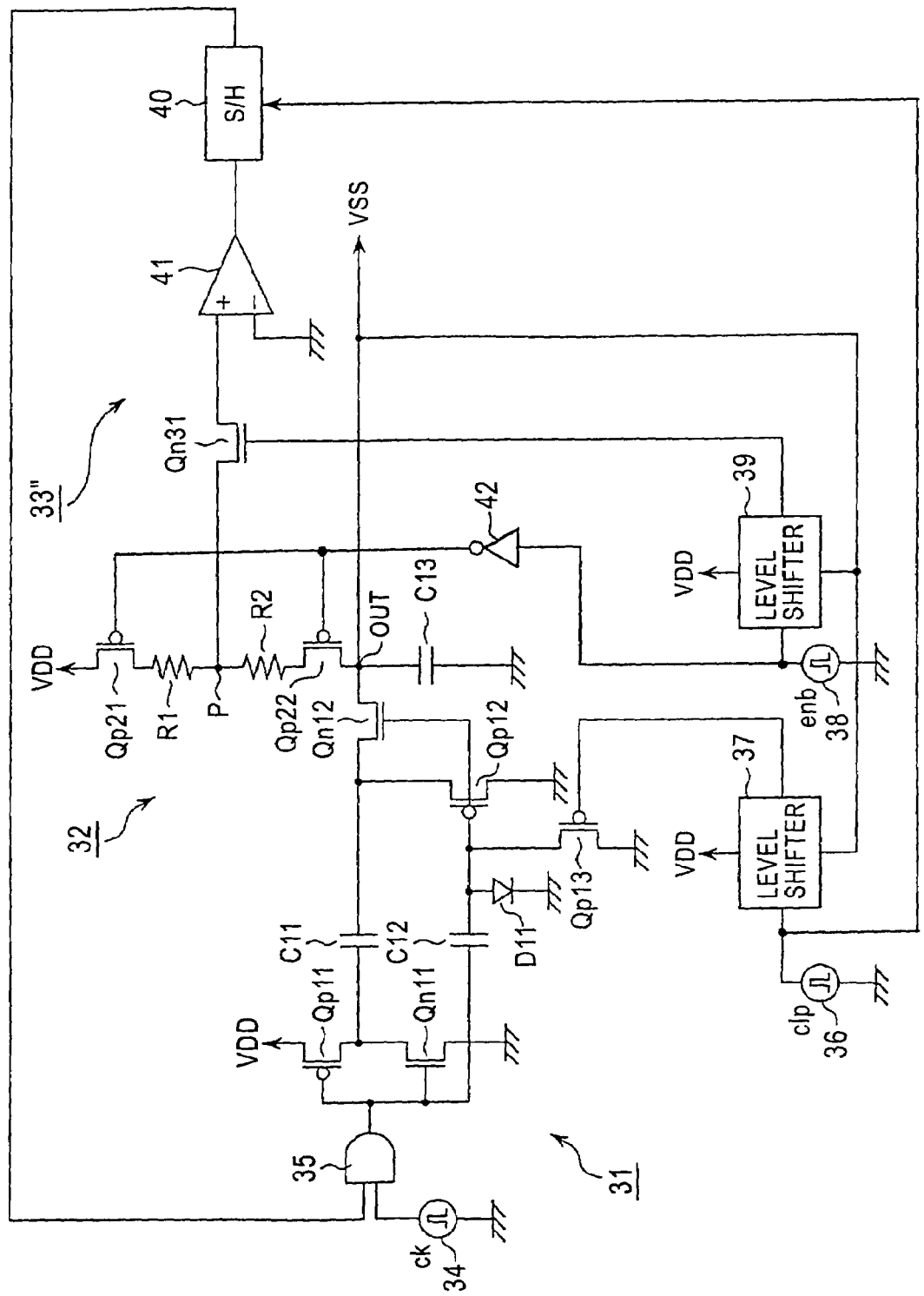
FIG. 7 is a circuit diagram of a third circuit example of the DC-DC converter.

FIG. 7 is a block diagram showing another circuit example (third circuit example) of the DC-DC converter 14. In FIG. 7, equivalent portions to those shown in FIG. 6 are designated by the same reference numerals. The DC-DC converter 14 according to the third circuit example includes a regulation circuit 33" having a different configuration from that of the regulation circuit 33' in the second circuit example, and other configuration of the DC-DC converter 14 is the same.

Specifically, in the regulation circuit 33" in this circuit example, for example, an n-channel MOS transistor Qn31 is used as a switching device, and, for example, the clamp pulse clp is used as a sampling pulse for the sample-and-hold circuit 40. The other components are basically the same as those in the second circuit example. The sampling pulse for the sample-and-hold circuit 40 is not limited to the clamp pulse clp.

In the DC-DC converter 14 according to the third circuit example, the enable pulse of the first amplitude voltage (VDD-0V) generated by the enable pulse generator 38 is polarity-reversed by the inverter 42, and is then applied to the gates of the MOS transistors Qp21 and Qp22 of the voltage dividing circuit 32. The enable pulse of the second amplitude voltage (VDD-VSS) is level-shifted by the level shifter 39, and is then applied to the gate of the n-channel MOS transistor Qn31.

The comparator 41 can have an offset cancellation function. The offset cancellation function is a function of detecting and canceling an offset, which is likely to be caused at an input of an amplifier that typically forms the comparator, so that the offset may not appear at the output thereof.

Figure 8:
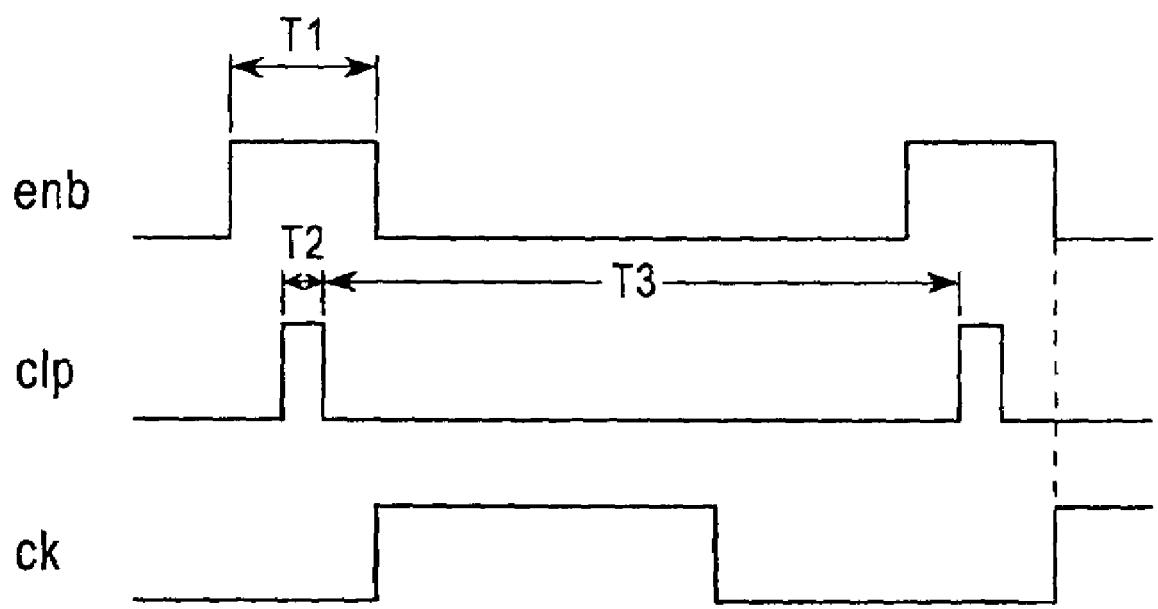
FIG. 8 is a timing chart for illustrating the operation of the DC-DC converter according to the third circuit example.

FIG. 8 is a timing chart for showing the circuit operation of the DC-DC converter 14 according to the third circuit example. In this timing chart, a time T1 indicates the comparing time of the comparator 41 (which is equal to an active period of the voltage dividing circuit 32 and the comparator 41), a time T2 indicates the sampling time of the sample-and-hold circuit 40, and a time T3 indicates the holding time of the sample-and-hold circuit 40.

The circuit operation of the DC-DC converter 14 according to the third circuit example in the case where the comparator 41 has the offset cancellation function is described below with reference to the timing chart of FIG. 8.

First, similarly to the previous circuit examples, the voltage dividing circuit 32 and the comparator 41 are active only for a period of the time T1, and the comparison result of the comparator 41 is sampled by the sample-and-hold circuit 40 for a period of the time T2 during the time T1 and is held for a period of the time T3 other than the times T1 and T2. The comparator 41 detects an offset for a certain period of time during the holding time T3, that is, for a period other than the comparing time T1, more specifically, for a period of time when the enable pulse enb is in the low level.

A logical AND of a clock which transitions at a time other than the sampling time T2, more specifically, the clock pulse ck generated by the clock pulse generator 34, and the hold output of the sample-and-hold circuit 40 is performed by the AND circuit 35, and the resulting local AND is supplied to the charge pump circuit 31 as a switching pulse. This causes the charge pump circuit 31 to perform the pumping operation using the local AND of the clock which transitions at a time other than the sampling time T2 and the hold output of the sample-and-hold circuit 40.

In the above-described circuit examples, the sample-and-hold circuit 40 is used as means for holding the divided voltage obtained from the voltage dividing circuit 32 or the comparison result of the comparator 41. However, it is not limited to the sample-and-hold circuit 40, and any other device capable of holding the divided voltage obtained from the voltage dividing circuit 32 or the comparison result of the comparator 41 for a certain period of time, such as a latch circuit or an SRAM, may be used. Furthermore, switching devices for making the voltage dividing circuit 32 active only for a certain period of time are configured such that the p-channel MOS transistors Qp21 and Qp22 are connected to both sides of the voltage-divider resistors R1 and R2. However, the p-channel MOS transistor Qp22 may be omitted.

In the above-described circuit examples, furthermore, a charge pump DC-DC converter of the negative voltage generation type that generates a circuit output voltage VSS of the −VDD level based on the internal circuit power supply voltage VDD is discussed, by way of example. However, the voltage level is not limited to the −VDD level, and a charge pump DC-DC converter of the positive voltage generation type that generates a positive power supply voltage having a different voltage value from the internal circuit power supply voltage VDD based on the internal circuit power supply voltage VDD may also be applicable.

In the above-described circuit examples, furthermore, both the voltage dividing circuit 32 and the comparator 41 are active only for a certain period of time, thereby reducing power consumption loss. This is the most preferable form, and one of the voltage dividing circuit 32 and the comparator 41 may be active only for a certain period of time, thereby also reducing the power consumption loss.

The charge pump DC-DC converter (power supply generating circuit) 14 according to the above-described circuit examples is formed integrally with the vertical driving circuit 12 and the selector circuit 13 in a peripheral region of the pixel unit 11 (so-called frame region) on the same substrate (liquid crystal display panel) 15, as is apparent from FIG. 1.

Since TFTs are used as pixel transistors of the pixel unit 11, TFTs may also be used as the transistors which constitute the DC-DC converter 14, including the MOS transistors Qp11 through Qp13, Qp21, Qp22, Qp31, Qn11, and Qn12 shown in FIGS. 4 and 6, and the transistors which constitute the level shifters 37 and 39, the sample-and-hold circuit 40, and the comparator 41, and at least these transistor circuits may be manufactured using the same process as that of the pixel unit 11, resulting in simple and low-cost production for formation of the DC-DC converter 14.

In the transistor circuits, the MOS transistors Qp11 and Qn11 forming a CMOS inverter are driven by the voltage 0V-VDD. Therefore, it is not necessary to isolate the other MOS transistors (including the diode D11), which require a high withstand voltage, if they are formed of TFTs, and they can be easily manufactured in a simple manner using the same process as that of the pixel unit 11. In this case, the other transistor circuits, etc., should be formed by a silicon chip on a substrate different from the liquid crystal display panel 15.

In the foregoing application examples, the charge pump DC-DC converter 14 according to the above-described embodiment is formed integrally with the pixel unit 11 on the liquid crystal display panel 15. However, it is not necessarily formed integrally with the pixel unit 11, and may be used as an external circuit to the liquid crystal display apparatus, or may be formed on a substrate different from the liquid crystal display panel 15.

As is apparent from the foregoing description, it is more advantageous if the charge pump DC-DC converter 14 is integrally formed on the same substrate as the liquid crystal display panel 15. In addition, since the charge pump DC-DC converter 14 according to the above-described circuit examples can achieve a large current capacity with a small circuit, and is significantly effective particularly when transistors having a large threshold voltage Vth, such as TFTs (thin-film transistors), are used, the DC-DC converter 14 formed integrally with the pixel unit 11 on the same substrate greatly contributes to a low-cost, thin and compact assembly including the liquid crystal display apparatus.

In the foregoing embodiment, the charge pump DC-DC converter according to the above-described circuit examples is used as a power supply generating circuit in an active-matrix liquid crystal display apparatus having liquid crystal cells as display devices (electro-optical devices) of pixels, by way of example. However, the present invention is not limited to an application to liquid crystal display apparatuses, and is also applicable to other active-matrix display apparatuses such as EL display apparatuses using electroluminescent (EL) devices as pixel display devices.

The display apparatus according to the present invention is suitable not only for a display of OA equipment such as personal computers and word processors, television receivers, and so on, but also for a display unit of portable terminal devices such as cellular telephones and PDAs intended to size reduction or compactness of the overall devices.

Figure 9:
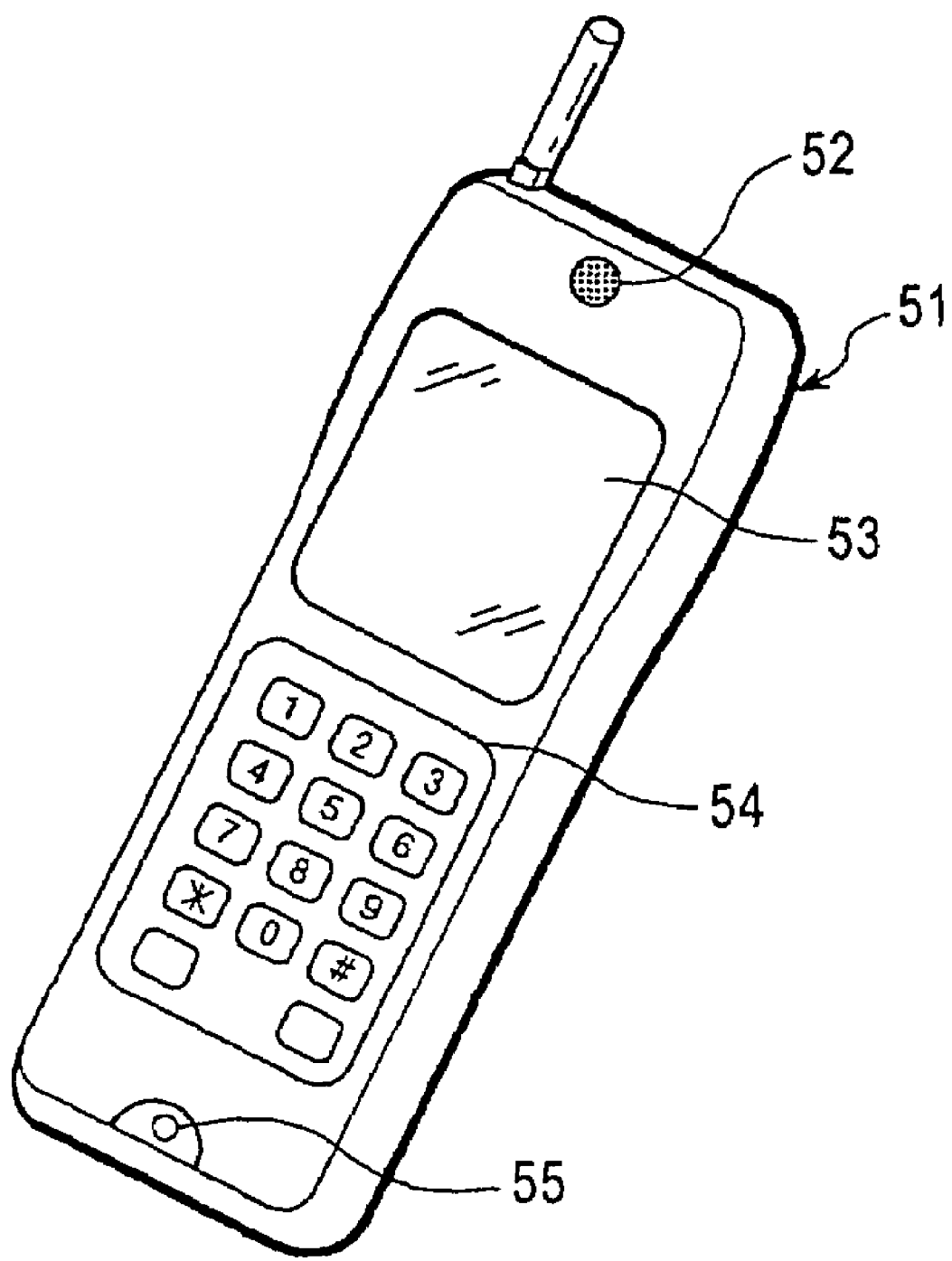
FIG. 9 is an external view schematically showing the structure of a cellular telephone according to the present invention.

FIG. 9 is an external view schematically showing the structure of a portable terminal device, such as a cellular telephone, according to the present invention.

The cellular telephone according to this example is constructed such that, on a front surface of a device case 51, a speaker unit 52, an output display unit 53, an operation unit 54, and a microphone unit 55 are arranged in turn from the top. In the cellular telephone of this structure, the output display unit 53 is implemented by a liquid crystal display apparatus, and the liquid crystal display apparatus according to the above-described embodiment is used as the liquid crystal display apparatus.

Accordingly, advantageously, the liquid crystal display apparatus incorporating the DC-DC converter according to the above-described circuit examples is used as the output display unit 53 of a portable terminal device such as a cellular telephone, which greatly contributes to a low-power-consumption and compact portable terminal device since the DC-DC converter can achieve a large current capacity with a small circuit. In particular, the DC-DC converter can provide low power consumption loss and high efficiency, thus achieving lower power consumption, and the life of a battery as a main power supply can be extended once it is charged.

Industrial Applicability

As described above, in a power supply generating circuit according to the present invention, a display apparatus incorporating the same, or a portable terminal device using the display apparatus as an output display unit, at least one of voltage dividing means and a comparator is active only for a certain period of time, thus making it possible for the comparator to compare voltages only for this active period. In other words, the voltage dividing means and the comparator are active only for the period when the voltages-are compared by the comparator and inactive otherwise. Therefore, the power consumption loss caused by the voltage dividing means and the comparator can be reduced.

The invention claimed is:

1. A power supply generating circuit comprising:
charge pump means for repeating charging and discharging operations in synchronization with a clock pulse;
voltage dividing means for dividing an output voltage of the charge pump means;
regulation means, having a comparator for comparing the divided voltage obtained from the voltage dividing means with a reference voltage, for controlling the supply of the clock pulse to the charge pump means based on the comparison result of the comparator; and
control means for making at least one of the voltage dividing means and the comparator active only for a certain period of time.

2. A power supply generating circuit according to claim 1, wherein the control means makes the voltage dividing means and the comparator inactive for a period other than the period when the voltages are compared by the comparator.

3. A power supply generating circuit according to claim 1, wherein the voltage dividing means includes voltage-divider resistors connected in series between an output terminal of the charge pump means and a reference potential point, and
the control means includes switching means connected in series with the voltage-divider resistors.

4. A power supply generating circuit according to claim 1, wherein the control means includes switching means connected between a voltage-divider point of the voltage dividing circuit and an input terminal of the comparator.

5. A power supply generating circuit according to claim 1, wherein the regulation means includes holding means for holding the comparison result of the comparator.

6. A power supply generating circuit according to claim 5, wherein the regulation means applies a logical AND of a clock which transitions at a time other than a sampling time of the holding means and a hold output of the holding means to the charge pump means.

7. A power supply generating circuit according to claim 5, wherein the holding means comprises a sample-and-hold circuit or a latch circuit for sampling the comparison result of the comparator for a period for which at least one of the voltage dividing means and the comparator is active and for holding or latching it for a period other than that period, and
the comparator has an offset cancellation function and detects an offset for a certain period of time during the hold or latch period of the sample-and-hold circuit or latch circuit.

8. A display apparatus comprising a pixel unit having an array of pixels on a substrate, and power supply generating means formed on the same substrate as the pixel unit for, based on an internal circuit power supply voltage, generating a power supply voltage having a different voltage value from the internal circuit power supply voltage,
wherein the power supply generating means includes:
charge pump means for repeating charging and discharging operations in synchronization with a clock pulse;
voltage dividing means for dividing an output voltage of the charge pump means;
regulation means, having a comparator for comparing the divided voltage obtained from the voltage dividing means with a reference voltage, for controlling the supply of the clock pulse to the charge pump means based on the comparison result of the comparator; and
control means for making at least one of the voltage dividing means and the comparator active only for a certain period of time during one horizontal scanning period.

9. A display apparatus according to claim 8, wherein the control means makes the voltage dividing means and the comparator inactive for a period other than the period when the voltages are compared by the comparator.

10. A display apparatus according to claim 8, wherein the voltage dividing means includes voltage-divider resistors connected in series between an output terminal of the charge pump means and a reference potential point, and
the control means includes switching means connected in series with the voltage-divider resistors.

11. A display apparatus according to claim 8, wherein the control means includes switching means connected between a voltage-divider point of the voltage dividing circuit and an input terminal of the comparator.

12. A display apparatus according to claim 8, wherein the regulation means includes holding means for holding the comparison result of the comparator.

13. A display apparatus according to claim 12, wherein the regulation means applies a logical AND of a clock which transitions at a time other than a sampling time of the holding means and a hold output of the holding means to the charge pump means.

14. A display apparatus according to claim 12, wherein the holding means comprises a sample-and-hold circuit or a latch circuit for sampling the comparison result of the comparator for a period for which at least one of the voltage dividing means and the comparator is active and for holding or latching it for a period other than that period, and
the comparator has an offset cancellation function and detects an offset for a certain period of time during the hold or latch period of the sample-and-hold circuit or latch circuit.

15. A display apparatus according to claim 8, wherein display devices of the pixels comprise liquid crystal cells.

16. A portable terminal device which uses a display apparatus as an output display unit, the display apparatus comprising a pixel unit having an array of pixels on a substrate, and power supply generating means formed on the same substrate as the pixel unit for, based on an internal circuit power supply voltage, generating a power supply voltage having a different voltage value from the internal circuit power supply voltage,
wherein the power supply generating means includes:
charge pump means for repeating charging and discharging operations in synchronization with a clock pulse;
voltage dividing means for dividing an output voltage of the charge pump means;
regulation means, having a comparator for comparing the divided voltage obtained from the voltage dividing means with a reference voltage, for controlling the supply of the clock pulse to the charge pump means based on the comparison result of the comparator; and
control means for making at least one of the voltage dividing means and the comparator active only for a certain period of time during one horizontal scanning period.

17. A portable terminal device according to claim 16, wherein the control means makes the voltage dividing means and the comparator inactive for a period other than the period when the voltages are compared by the comparator.

18. A portable terminal device according to claim 16, wherein the voltage dividing means includes voltage-divider resistors connected in series between an output terminal of the charge pump means and a reference potential point, and
the control means includes switching means connected in series with the voltage-divider resistors.

19. A portable terminal device according to claim 16, wherein the control means includes switching means connected between a voltage-divider point of the voltage dividing circuit and an input terminal of the comparator.

20. A portable terminal device according to claim 16, wherein the regulation means includes holding means for holding the comparison result of the comparator.

21. A portable terminal device according to claim 20, wherein the regulation means applies a logical AND of a clock which transitions at a time other than a sampling time of the holding means and a hold output of the holding means to the charge pump means.

22. A portable terminal device according to claim 20, wherein the holding means comprises a sample-and-hold circuit or a latch circuit for sampling the comparison result of the comparator for a period for which at least one of the voltage dividing means and the comparator is active and for holding or latching it for a period other than that period, and
the comparator has an offset cancellation function and detects an offset for a certain period of time during the hold or latch period of the sample-and-hold circuit or latch circuit.

23. A portable terminal device according to claim 16, wherein the display apparatus comprises a liquid crystal display apparatus which uses liquid crystal cells as display devices of the pixels.

* * * * *